US007402347B2

(12) United States Patent
Morrison et al.

(10) Patent No.: US 7,402,347 B2
(45) Date of Patent: Jul. 22, 2008

(54) IN-SITU FORMED THERMAL BARRIER COATING FOR A CERAMIC COMPONENT

(75) Inventors: Jay A. Morrison, Oviedo, FL (US); Daniel G. Thompson, Pittsburgh, PA (US); Gary B. Merrill, Orlando, FL (US); Jay Edgar Lane, Mims, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 122 days.

(21) Appl. No.: 11/031,796

(22) Filed: Jan. 7, 2005

(65) Prior Publication Data

US 2006/0121296 A1 Jun. 8, 2006

Related U.S. Application Data

(63) Continuation-in-part of application No. 11/002,028, filed on Dec. 2, 2004, now Pat. No. 7,153,096.

(51) Int. Cl.

*B64C 11/16* (2006.01)
*B64C 27/46* (2006.01)
*F01D 5/14* (2006.01)
*B63H 27/46* (2006.01)

(52) U.S. Cl. .................... 428/701; 428/702; 416/241 B

(58) Field of Classification Search ....................... None
See application file for complete search history.

(56) References Cited

U.S. PATENT DOCUMENTS 3,619,077 A 11/1971 Wile
4,314,794 A 2/1982 Holden et al.
4,464,097 A * 8/1984 Schultz ....................... 416/230
5,110,652 A * 5/1992 Allaire et al. ............... 428/114
5,856,027 A 1/1999 Murphy
6,013,592 A 1/2000 Merrill et al.
6,197,424 B1 * 3/2001 Morrison et al. ............ 428/402
6,235,370 B1 5/2001 Merrill et al.
6,277,448 B2 8/2001 Strutt et al.
6,478,535 B1 * 11/2002 Chung et al. ................ 415/115
6,521,053 B1 2/2003 Grylls et al.
6,609,894 B2 8/2003 Jackson et al.
6,635,124 B1 10/2003 Stowell et al.
6,641,907 B1 11/2003 Merrill et al.
6,689,487 B2 2/2004 Murphy
6,706,319 B2 3/2004 Seth et al.
7,066,717 B2 * 6/2006 Morrison et al. ............ 416/230

* cited by examiner

*Primary Examiner*—Timothy M. Speer
*Assistant Examiner*—Gordon R Baldwin

(57) ABSTRACT

A thermal barrier layer (20) is formed by exposing an oxide ceramic material to a thermal regiment to create a surface heat affected zone effective to protect an underlying structural layer (18) of the material. The heat affected surface layer exhibits a lower strength and higher thermal conductivity than the underlying load-carrying material; however, it retains a sufficiently low thermal conductivity to function as an effective thermal barrier coating. Importantly, because the degraded material retains the same composition and thermal expansion characteristics as the underlying material, the thermal barrier layer remains integrally connected in graded fashion with the underlying material without an interface boundary there between. This invention is particularly advantageous when embodied in an apparatus formed of an oxide-oxide ceramic matrix composite (CMC) material wherein reinforcing fibers (24) are anchored in the underlying load-carrying portion and extend into the non-structural thermal barrier portion to provide support and to function as surface crack arrestors. In one embodiment an airfoil (10) is formed of a stacked plurality of CMC plates having such a heat-affected thermal barrier layer formed thereon.

27 Claims, 2 Drawing Sheets

IN-SITU FORMED THERMAL BARRIER COATING FOR A CERAMIC COMPONENT

CROSS REFERENCE TO RELATED APPLICATIONS

This application is a continuation-in-part of U.S. application Ser. No. 11/002,028, filed Dec. 2, 2004 now U.S. Pat. No. 7,153,096.

FIELD OF THE INVENTION

This invention relates generally to the field of ceramic components used in high temperature applications, and in one embodiment, to a load-bearing component of a gas turbine engine formed of a ceramic matrix composite material.

BACKGROUND OF THE INVENTION

The ongoing demand for improved efficiency has resulted in the design of modern gas turbine engines operating at increasingly high temperatures. Generally, when the combustion gas temperature exceeds a value at which a structural material begins to degrade, the designer is forced to select a different material having a higher safe operating temperature, to provide a cooling mechanism for the material, and/or to coat the structural material with a non-structural thermal barrier coating. Special superalloy and ceramic materials have been developed for use at the high temperatures generated by hot combustion gasses in a gas turbine engine. For example, A-N720 is an oxide-oxide ceramic matrix composite (CMC) material available from COI Ceramics, Inc. that can safely function without significant degradation at temperatures up to about 1,200° C. For temperatures exceeding this value, active or passive cooling techniques may be used to protect the material. Alternatively or in combination with cooling, a thermal barrier coating may be applied to protect the material from the environment. U.S. Pat. No. 6,013,592, commonly assigned with the present invention, describes one such ceramic thermal barrier coating material applied to a ceramic matrix composite substrate.

The use of a thermal barrier coating creates a new set of concerns for the designer. First, the coating process adds cost and the coating adds weight to the component. Furthermore, failure of the coating can lead to failure of the component, thus potentially detracting from the statistical reliability of the system. A thermal barrier coating must remain firmly bonded to the substrate in order to be effective. One mode of coating failure is spalling due to differential thermal expansion between the coating and the substrate. U.S. Pat. No. 6,013,592 addresses this problem by varying the composition of ceramic spheres within the coating to adjust the coefficient of thermal expansion to a desired value. Nonetheless, thermal barrier coatings with improved reliability and reduced cost are desired.

BRIEF DESCRIPTION OF THE DRAWINGS

The invention is explained in following description in view of the drawings that show.

DETAILED DESCRIPTION OF THE INVENTION

Figure 1:
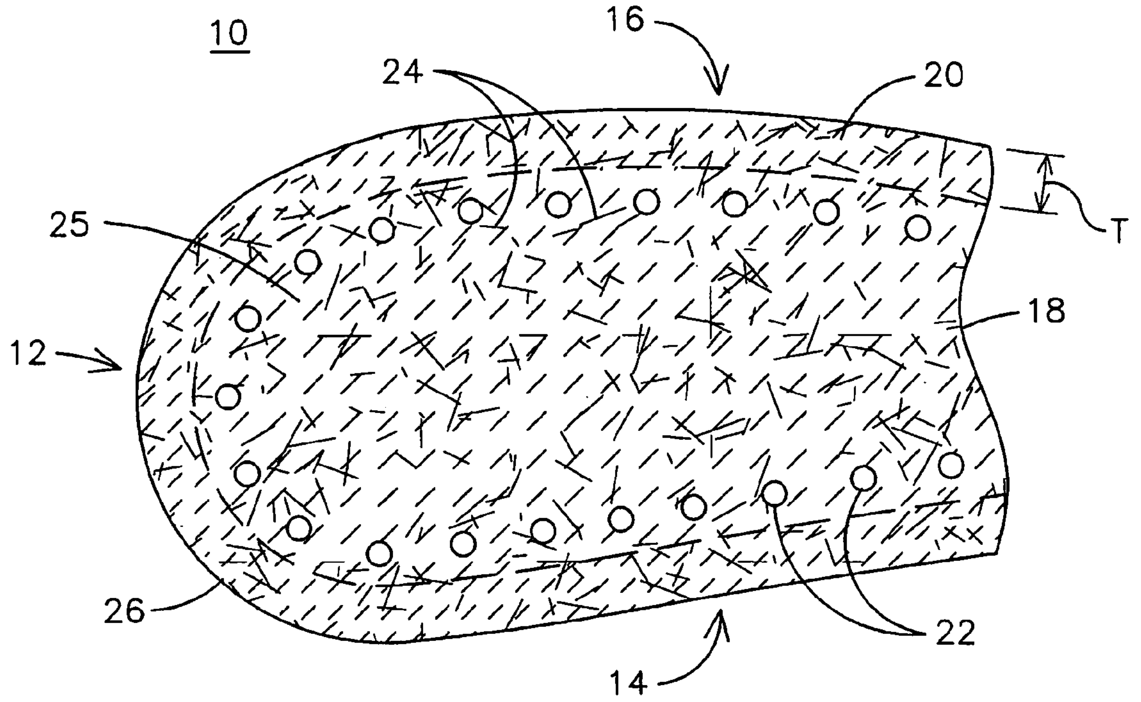
FIG. 1 is a partial cross-sectional view of an airfoil for a gas turbine engine formed of a ceramic material having an in-situ formed thermal barrier coating layer on its exposed outer surface.

The present inventors have innovatively recognized the possibility of using a ceramic component at temperatures beyond the ceramic material's normal design temperature limit by allowing the ceramic material to be transformed/degraded by the high temperature environment into an effective thermal barrier coating layer that functions to protect an underlying load-bearing portion of the component. One such component is the airfoil 10 of FIG. 1. Airfoil 10 is illustrated in partial cross-sectional view with its leading edge 12 and respective portions of its pressure side 14 and suction side 16 shown. The airfoil 10 may be formed of a ceramic material, such as an oxide-oxide ceramic matrix composite material. The airfoil 10 includes an inner structural load-bearing portion or layer 18 and an outer heat affected zone thermal barrier portion or layer 20. The term "structural" is used herein to designate that portion of a component that is designed to carry the loads imposed on the component; as differentiated from the outer thermal barrier layer portion of the component that may incidentally carry some loads but that is not relied upon as a load carrying member in the design of the component. The outer thermal barrier portion 20 is formed of the same composition as the inner structural portion 18. The difference between the two regions of material is that the outer portion 20 has been exposed to a thermal regiment of temperature/time that has thermally aged the material sufficiently to create a heat-affected zone. As used herein, the terms "heat-affected" and "heat-affected layer" and "heat-affected zone" and the like are used to describe a region of material that exhibits at least a 25% reduction in strength at room temperatures (e.g. in the realm of 25 ° C.) or at least a 25% increase in thermal conductivity at 1,000° C. when compared to the material's original properties prior to a thermal aging process. In the case of an oxide-oxide ceramic matrix composite material such as A-N720, the heat aging may cause grain growth and densification, thereby giving the heat-affected material a higher graded density range, a higher thermal conductivity range, a lower strength range, and a lower ductility range than the material of the inner portion 18 that is not heat-affected. Breaking tradition from prior art designs that have tried to avoid such material degradation, the present inventors have recognized that such a heat-affected outer portion 20 may retain certain properties that permit it to be utilized as a thermal barrier coating for protecting the underlying structural portion 18. In particular, while the thermal conductivity of the outer layer 20 is significantly higher than that of the inner portion 18, and while the strength of the outer layer 20 is significantly less than that of the inner portion 18, the layer 20 retains properties that allow it to function as an effective thermal barrier layer.

Figure 2:
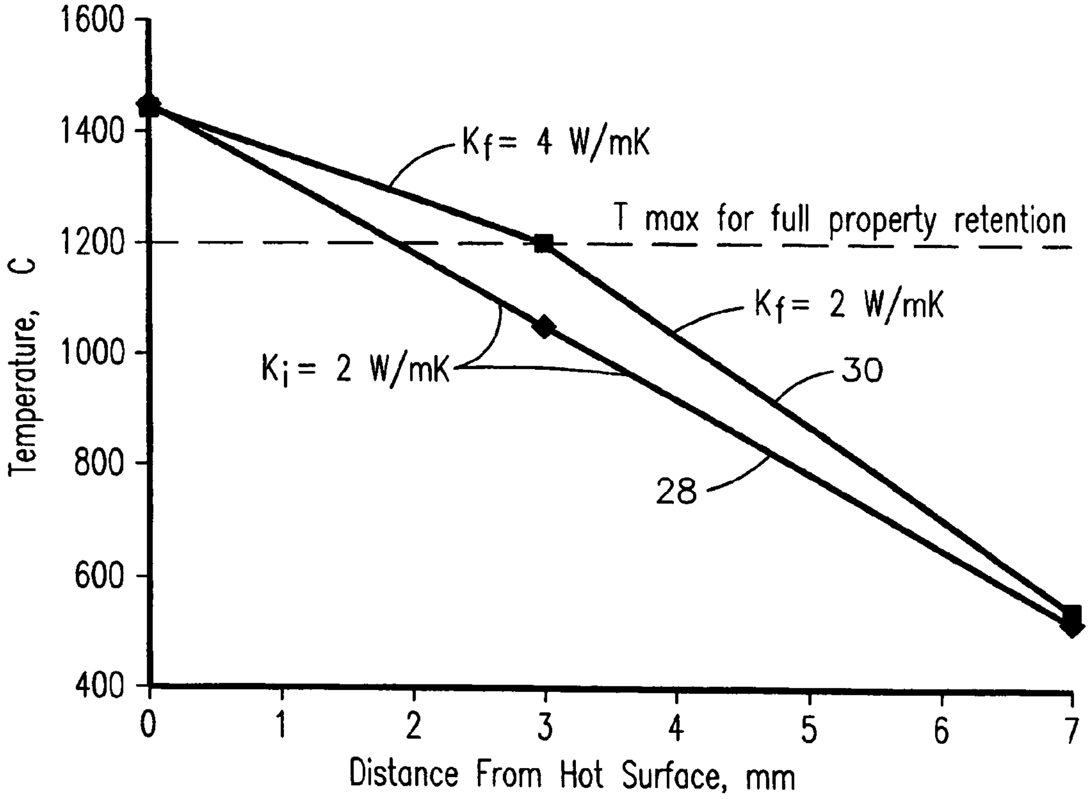
FIG. 2 illustrates the effect of thermal aging on the temperature gradient across a ceramic matrix composite material.

This concept is explained further with reference to FIG. 2, which illustrates the temperature gradient across the thickness of an A-N720 CMC component for both a new component (curve 28) and for the component after it has been thermally aged at 1,500° C. for at least 1,000 hours (curve 30). Although actual conductivity measurements have not been completed, based upon the known aging properties of the constituent materials of the composite, A-N720 CMC material is expected to exhibit a change in thermal conductivity from approximately 2 W/mK to approximately 4 W/mK at the exposed surface when subjected to temperatures exceeding 1,200° C. for an extended duration. Note that the thermal conductivity would gradually change with time and would remain less than 4 W/mK in regions below the exposed surface where somewhat lower temperatures may be experienced due to the insulating effect of the overlying material. However, in order to simplify the example of FIG. 2, a conservative step change from 2 W/mK to 4 W/mK is assumed for all material exposed to a temperature greater than 1,200° C. FIG. 2 illustrates an embodiment where a sub-surface cooled gas turbine airfoil is operating at a gas temperature of 1,600° C. The high gas temperature will gradually heat and degrade the outermost portion of the material, eventually creating a heat-affected zone having a thickness of about 3 mm. Upon reaching this condition, no further degradation or growth of the heat affected zone would occur since the material deeper than 3 mm is maintained at a temperature of less than 1,200° C. by the overlying heat-affected material. As a result, the subsurface temperature at a depth of 3 mm will increase from approximately 1,050° C. in the new condition of curve 28 to approximately 1,200° C. for the heat-affected condition of curve 30. The resulting heat-affected zone thermal barrier layer having a thickness T of approximately 3 mm will provide adequate thermal insulation to protect the underlying 4 mm thick load-carrying layer from thermal degradation and from thermal stress failure during operation of the airfoil in the gas turbine engine. A thickness of 4 mm is used in some gas turbine airfoil designs and is adequate to carry the required loads. Thus, in this example, a 7 mm thick CMC airfoil member is exposed to a thermal regiment to create a 3 mm thick heat-affected zone thermal barrier coating that is adequate to protect an underlying 4 mm thick structural member that has sufficient strength to carry the required loads.

Advantageously, the thermal barrier portion 20 retains the same composition and coefficient of thermal expansion as the inner load-carrying portion 18. Unlike the simplifying assumption used for FIG. 2, in actual applications the properties of the outer portion 20 advantageously become graded across its thickness T due to the temperature gradient that exists during the thermal regiment. Outer thermal barrier portion 20 is integrally connected in graded fashion with the inner load-bearing portion 18. Thus, unlike prior art coated components, the airfoil 10 of the present invention exhibits no interface between the protective outer layer 20 and the load-carrying inner layer 18. Furthermore, no separate coating step is needed, and the thermal regiment used to create the layer 20 may be at least partially accomplished during the actual use of the component 10. This approach also eliminates processing problems associated with prior art coatings, such as the need to match sintering shrinkage values and coefficients of thermal expansion. This approach may be applied to a broad range of shapes and it is not limited by the complexity of the apparatus design. Furthermore, the thermal barrier coating 20 is adherent, reliable and damage tolerant at no additional cost.

The present concept of in-situ formed thermal barrier layers is preferably embodied in an oxide ceramic material, since metals and non-oxide ceramic materials may exhibit chemical and physical changes during thermal aging that are not complimentary with the underlying non-aged material. Typical ceramic oxide materials useful in the present invention include but are not limited to mullite, alumina, yttria, zirconia, ceria and yttrium aluminum garnet (YAG), in both monolithic and composite forms.

Metals will oxidize under high temperature combustion environments to form an oxide coating that may passivate against further oxidation. However, these coatings are inherently unstable due to a mismatch of coefficients of thermal expansion and/or sintering of the coating, resulting in spallation of the coating after a critical thickness is formed. Furthermore, the critical thickness is far less than that required to form an effective thermal barrier. Also, metal oxides are formed via diffusion of subsurface species to the surface to form the outer layer, thus depleting the substrate of alloying elements and degrading the substrate properties.

Non-oxide ceramics and non-oxide ceramic matrix composites suffer from severe oxidation and corrosion if exposed in gas turbine environments above 1,200° C. For example, SiC-based ceramic matrix composites will oxidize to form a protective oxide layer of $SiO_2$. However, this layer is susceptible to volatilization from a water vapor corrosion mechanism. Furthermore, these oxide layers are also of insufficient thickness to protect the substrate thermally.

Because the surface layer 20 formed in an oxide ceramic remains the same in composition and thermal expansion as the underlying load-carrying material, the embodiment of the present invention using an oxide ceramic is uniquely different from any other material class wherein the surface is fundamentally changed through an oxidation or other process. The change that does occur in the surface layer 20 is not an abrupt change and it results in no interface between the coating 20 and the substrate 18, as is the case with metals and non-oxide ceramics. The resulting structure 10 is a true functionally graded material that is graded in-situ and is formed of a single material system, whereas most functionally graded materials are formed with graded materials of differing compositions. Furthermore, the formation of the heat-affected zone thermal barrier coating 20 has no adverse impact on the properties of the underlying structural material layer 18.

Figure 3:
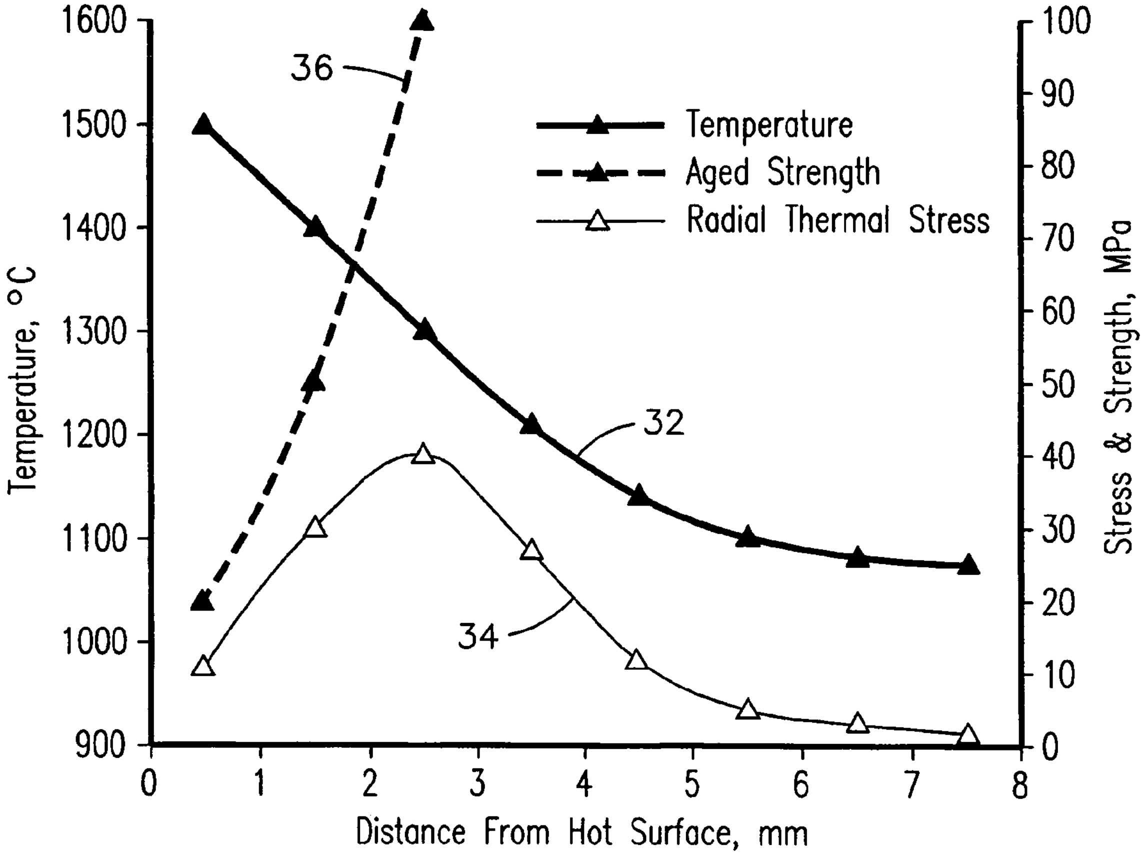
FIG. 3 illustrates the relationships between temperature, stress and strength as a function of distance from a hot surface in one embodiment of the present invention.

The through-thickness thermal gradient imposed on the component surface will dictate the thermal degradation profile during the in-situ formation of the thermal barrier layer 20 as well as the stress profile during this process and during normal operation of the component 10. Cooling schemes can be devised to balance these effects to result in a desired applied stress vs. retained strength relationship; for example the use of cooling passages 22 formed in the load-carrying portion 18 proximate the protective outer layer 20. FIG. 3 illustrates an exemplary relationship between stress and strength for an embodiment where the gas turbine airfoil 10 is formed of a stacked plurality of flat plates, each plate being formed of A-N720 ceramic matrix composite material having ceramic oxide fibers 24 disposed in a ceramic oxide matrix 25. This type of airfoil construction is described more fully in the co-pending United States patent application titled "Stacked Laminate CMC Turbine Vane" invented by Daniel G. Thompson, Steven James Vance and Jay A. Morrison, application Ser. No. 11/002,028, filed on Dec. 2, 2004, commonly assigned with the present application and incorporated by reference herein in its entirety. In such an embodiment, the view of FIG. 1 would be a cross-section through one of the laminates, with adjacent laminates being stacked above and below the sectioned laminate and parallel to the plane of the figure. The reinforcing fibers 24 in this embodiment extend in various directions along the plane of the figure, and thus extend to interconnect the weakened heat-affected zone 20 and the stronger underlying load-carrying portion 18. In this orientation, the reinforcing fibers 24 are oriented to resist the thermal stresses in the component. A crack initiating at the surface 26 and extending into the thermal barrier layer 20 would encounter reinforcing fibers 24 that would serve to limit crack growth. Reinforcing fibers in the weakened layer 20 are firmly anchored in the stronger material portion 18.

Curve 32 of FIG. 3 illustrates how the temperature drops as the distance from the hot surface 26 increases for the embodiment of an A-720N CMC component. Curve 34 illustrates that the radial thermal stress (i.e. stress in a direction perpendicular to the curved exposed surface 26 of the airfoil 10 in the plane of FIG. 1) in the component is expected to reach a peak value at a distance below the surface 26 then to reduce with increasing distance. This stress is often limiting for typical airfoil configurations, with a tensile stress component acting to pull the coating away from the underlying material in a radial direction. Curve 36 illustrates the expected strength of the ceramic matrix composite material as a function of distance below the surface 26, and it reflects the graded nature of the strength across the thickness T of the thermal barrier layer 20 resulting from an extended period of thermal aging. Although distances of less than 1 mm from the surface are not modeled or illustrated in FIG. 3, it is expected that the aged strength of curve 36 remains above the applied stress of curve 34 at all depths. Furthermore, the strength of the heat-affected fiber-reinforced CMC material is expected to remain above that of common prior art thermal barrier coatings. For example, the thermal barrier coating material described in U.S. Pat. No. 6,013,592 exhibits a tensile strength of about 7 Mpa in its new condition. The in-plane (fiber direction) tensile strength of A-720N CMC material is about 190 MPa in its new condition; after exposure to a temperature of 1,300° C. for 100 hours, the tensile strength is about 138 Mpa; after exposure to a temperature of 1,400° C. for 10 hours, the tensile strength is about 72 MPa; and after exposure to a temperature of 1,500° C. for 10 hours, the tensile strength of this material is about 50 MPa. While comprehensive aging strength data for this material is not currently available to the present inventors, it is believed that the strength of this material will remain above that of the insulating material of U.S. Pat. No. 6,013,592 for the entire useful life of a gas turbine component utilizing the present invention, thereby further supporting its selection as a thermal barrier coating material in its heat-affected condition.

The outer portion 20 of material may be aged using any variety of heat sources, for example, infrared lamps, laser energy, burner, oven, etc. The aging may be accomplished in whole or in part during normal operation of a gas turbine engine in which the component is installed, or the component may be pre-aged in a special engine set up for such operations. Upon the initial heating of the airfoil 10, the hot external environment and the cooling provided by coolant in the cooling passages 22 generate surface compressive stresses and subsurface tensile stresses. Densification and the associated local shrinkage of the material would tend to mitigate these stresses somewhat. Over time, creep relaxation of the hot surface results in a low thermal stress state at steady-state temperature conditions. The elevated temperature conditions gradually degrade the surface layer 20. Upon a subsequent cool down, a stress reversal takes place, with the surface layer going into residual tension and the subsurface material going into compression at ambient temperature. If the residual tensile stress at the surface exceeds the degraded strength of the surface material, small cracks normal to the surface will develop. The cracks result in stress relief and the depth of the cracks will be determined by the relationship of the retained strength verses stress profile into the thickness T of the upper layer 20. Such surface cracks have been found to be advantageous and to increase the useful life in thermal barrier coatings. For embodiments where reinforcing fibers extend to proximate the surface 26, as illustrated in FIG. 1, the fibers will function to arrest the crack depth as they extend toward the load-bearing non-aged portion 18. The surface layer 20 is thus weakened but remains stable, adherent, compatible in composition and thermal expansion, and thermally protective of the underlying structural portion 18. The loss of strength resulting from the degradation of the sacrificial surface layer 20 must be considered during the design of the component 10 so that the remaining structural layer 18 of the material remains capable of carrying the design loads imposed on the component 10.

In one embodiment, the heat affected zone thermal barrier layer of the present invention may have a thickness perpendicular to its surface 26 of at least 0.25 mm. A typical ply of CMC material is about 0.25 mm thick, so a design incorporating the present invention may accommodate the need for sacrificial material by the addition of as little as a single additional ply of material. In other embodiments, the heat affected zone thermal barrier layer may be at least 0.5 mm thick, or at least 3 mm thick, or at least 5 mm thick.

One may appreciate that the thickness of the heat affected material and the conductivity of the material both affect the heat flux passing through the thermal barrier layer 20 into the structural material 18 for a given temperature differential. This relationship is expressed by the equation Q=(k/t)ΔT, where Q is heat flux (W/m$^2$K), k is thermal conductivity (W/mK), t is thickness (m), and ΔT is temperature differential (° K.). The present inventors have found the relationship kit to be a useful parameter for specifying a desired degree of protection afforded by an outermost layer of heat-affected material. "Effective k/t" is used herein to denote the cumulative effect of conductivity integrated over the entire heat affected zone of material. For multiple discrete layers, this may be determined using the series equation $$\left(\frac{k}{t}\right)_{effective} = \frac{1}{\sum\left(\frac{t}{k}\right)_i}$$

where the summation is for all individual layers, i. In one embodiment, the effective k/t value for a thermally grown heat-affected zone thermal barrier layer is less than 5,000 W/m$^2$. By growing the heat-affected zone to have an effective value of k/t of less than 5,000 W/m$^2$, a useful degree of protection is afforded to the underlying structural material for a wide range of environments that are typically experienced in modern gas turbine engines. In other embodiments the effective k/t of the heat-affected zone may be less than 2,500 W/m$^2$, or less than 1,000 W/m2, or less than 500 W/m$^2$, or less than 250 W/m$^2$.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus comprising a heat-affected thermal barrier portion of a ceramic oxide material integral with an underlying cooled structural portion of the ceramic oxide material, the heat-affected thermal barrier portion effective to thermally protect the underlying structural portion from a high temperature operating environment.

2. The apparatus of claim 1, further comprising the heat-affected portion having an effective k/t of less than 5,000 W/m$^2$.

3. The apparatus of claim 1, further comprising the heat-affected portion having an effective k/t of less than 2,500 W/m$^2$.

4. The apparatus of claim 1, further comprising the heat-affected portion having an effective k/t of less than 1,000 $W/m^2$.

5. The apparatus of claim 1, further comprising the heat-affected portion having a thickness of at least 0.25 mm.

6. The apparatus of claim 1, further comprising the heat-affected portion having a thickness of at least 0.5 mm.

7. The apparatus of claim 1, further comprising the heat-affected portion having a thickness of at least 3 mm.

8. The apparatus of claim 1, wherein the ceramicoxide material comprises an oxide-oxide ceramic matrix composite material, and wherein reinforcing fibers of the ceramic matrix composite material interconnect the heat-affected portion and the structural layer.

9. An apparatus comprising:

an inner load-bearing portion of a ceramic oxide material exhibiting a first thermal conductivity and a first strength;

a cooling passage effective to cool the inner load-bearing portion;

an outer heat-affected thermal barrier portion of the ceramic oxide material integrally connected in graded fashion with the inner load-bearing portion;

the outer portion exhibiting a graded thermal conductivity range higher than the first thermal conductivity and a graded strength range lower than the first strength resulting from exposure of a surface of the ceramic oxide material to a high temperature while the inner load-bearing portion of the ceramic oxide material is cooled by coolant passing through the cooling passage; and a thickness of the outer portion effective to provide a desired degree of thermal protection to the cooled inner load-bearing portion during use of the apparatus in a high temperature environment such that a strength of the inner load-bearing portion remains greater than a level of stress applied to the inner load-bearing portion.

10. The apparatus of claim 9, further comprising the outer heat-affected thermal barrier portion having an effective k/t of less than 5,000 $W/m^2$.

11. The apparatus of claim 9, further comprising the outer heat-affected thermal barrier portion having an effective k/t of less than 1,000 $W/m^2$.

12. The apparatus of claim 9, further comprising the outer heat-affected thermal barrier portion having a thickness of at least 0.25 mm.

13. The apparatus of claim 9, further comprising the outer heat-affected thermal barrier portion having a thickness of at least 0.5 mm.

14. The apparatus of claim 9, wherein the ceramic oxide material comprises an oxide-oxide ceramic matrix composite material comprising reinforcing fibers extending between the inner load-bearing portion and the outer heat-affected thermal barrier portion.

15. An apparatus comprising:

a structural member comprising an oxide-oxide ceramic matrix composite material;

an outer heat-affected layer having a thickness of at least 0.25 mm formed in the oxide-oxide ceramic matrix composite material and effective to thermally insulate an underiying structural layer of the oxide-oxide ceramic matrix composite material from an exterior environment; and reinforcing fibers of the oxide-oxide ceramic matrix composite material extending to interconnect the outer heat-affected layer with the underlying structural layer.

16. The apparatus of claim 15, wherein the heat-affected layer has a thickness of at least 0.5 mm.

17. The apparatus of claim 15, wherein the heat-affected layer exhibits an effective k/t of less than 5,000 $W/m^2$.

18. The apparatus of claim 15, wherein the heat-affected layer exhibits an effective k/t of less than 1,000 $W/m^2$.

19. An airfoil comprising:

a stacked plurality of plates, each plate comprising an oxide-oxide ceramic matrix composite material comprising an outer surface defining an airfoil shape;

an outer heat-affected portion of each plate collectively defining a thermal barrier layer for the airfoil effective to thermally protect an underlying structural portion of each plate from an exterior environment; and reinforcing fibers of the oxide-oxide ceramic matrix composite material extending to interconnect the outer heat-affected portion with the underlying structural portion.

20. The airfoil of claim 19, further comprising the thermal barrier layer comprising an effective k/t of less than 5,000 $W/m^2$.

21. The airfoil of claim 19, further comprising the thermal barrier layer comprising an effective k/t of less than 1,000 $W/m^2$.

22. The airfoil of claim 19, further comprising the thermal barrier layer comprising a thickness of at least 0.25 mm.

23. The airfoil of claim 19, further comprising the thermal barrier layer comprising a thickness of at least 0.5 mm.

24. An apparatus comprising:

an inner load-bearing portion of a ceramic oxide material;

a coolant applied to the inner load-bearing portion;

an outer heat-affected thermal barrier portion of the ceramic oxide material integrally connected in graded fashion with the inner load-bearing portion, the outer heat-affected thermal barrier portion formed by exposure of a surface of the ceramic oxide material to a high temperature while the inner load-bearing portion of the ceramic oxide material is cooled by the coolant; and a plurality of cracks extending from the surface into the outer portion and formed as a result of residual stresses generated in the outer portion by the exposure of the surface to the high temperature and subsequent cool down, the plurality of cracks effective to provide stress relief in the outer portion.

25. The apparatus of claim 24, further comprising:

reinfoming fibers disposed within the ceramic oxide material and extending proximate the surface;

wherein respective depths of the cracks are arrested by the reinforcing fibers.

26. The apparatus of claim 25, further comprising theouter heat-affected thermal barrier portion of the ceramic oxide material comprising an effective k/t of less than 2,500 $W/m^2$.

27. The apparatus of claim 26, wherein the apparatus comprises a plate comprising an outer surface defining an airfoil shape.

* * * * *